United States Patent [19]

Robinson et al.

[11] Patent Number: 4,733,968

[45] Date of Patent: Mar. 29, 1988

[54] DATUM SENSING USING OPTICAL GRATING

[75] Inventors: Laurence J. Robinson, Royston; Robert M. Pettigrew, Foxton, both of England

[73] Assignee: Dr. Johannes Heidenhain GmbH, Traunreut, Fed. Rep. of Germany

[21] Appl. No.: 885,007

[22] Filed: Jul. 14, 1986

[30] Foreign Application Priority Data

Jul. 19, 1985 [GB] United Kingdom ............... 8518290

[51] Int. Cl.$^4$ ........................................... G01B 11/02
[52] U.S. Cl. ............................. 356/374; 250/237 G; 356/375
[58] Field of Search ............... 356/373, 374, 375, 400, 356/401, 356; 250/237 G; 340/347 P

[56] References Cited

U.S. PATENT DOCUMENTS 3,364,813  1/1968  McKinney ............... 356/373
4,097,734  6/1978  Erickson ............... 250/237 G

FOREIGN PATENT DOCUMENTS 182312  10/1984  Japan ............... 356/374

Primary Examiner—Davis L. Willis
Assistant Examiner—Matthew W. Koren
Attorney, Agent, or Firm—Lee, Smith & Zickert

[57] ABSTRACT

Apparatus for detecting a datum position in a range of movement of a movable member, comprises a composite grating comprising first and second gratings. The first grating has first and second grating halves and the second grating has third and fourth grating halves which are respectively identical to the first and second grating halves except that the third and fourth grating halves are separated by a spacing. The image of the third grating half is reflected upon the image of the first grating half, the image of the second grating half upon the fourth grating half, the first grating half upon the third grating half and the fourth grating half upon the second grating half. A quadrant detector detects the intensity of the interference images and provides a difference signal which passes through zero at the datum position of the member.

5 Claims, 4 Drawing Figures

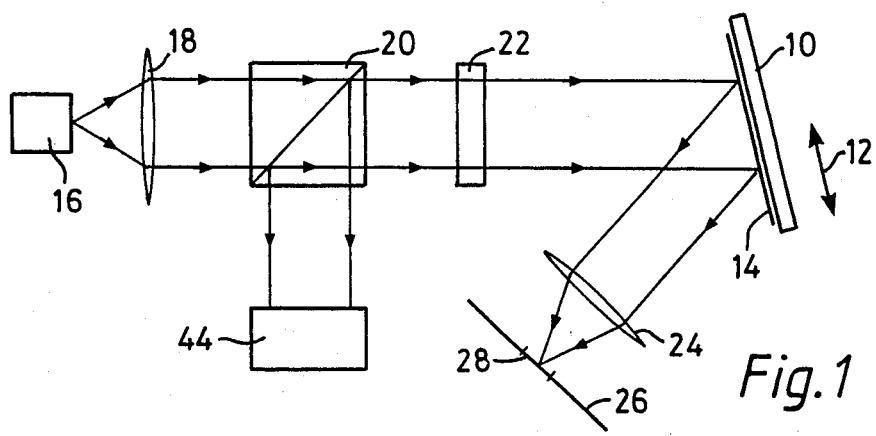
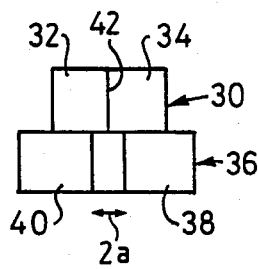
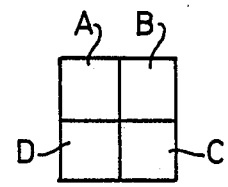
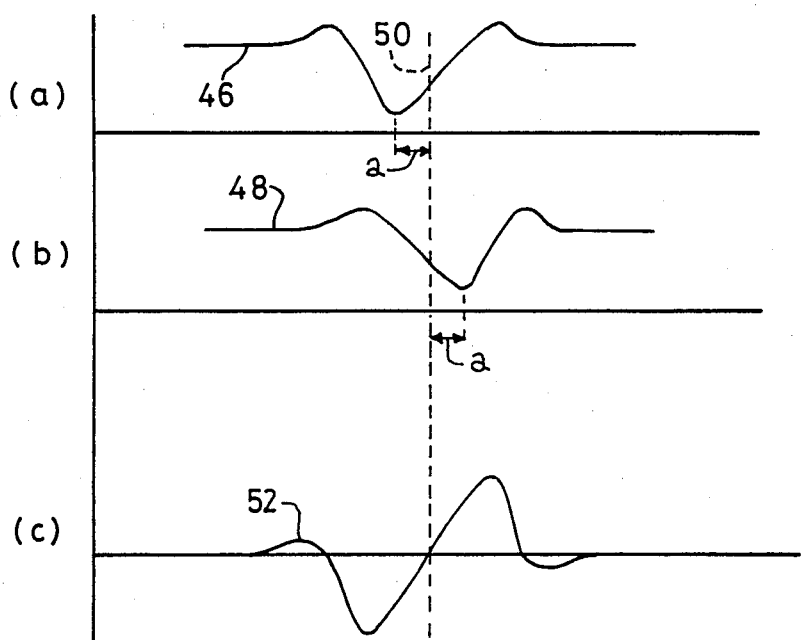

DATUM SENSING USING OPTICAL GRATING

DESCRIPTION

1. Field of the invention

This invention relates to apparatus for detecting a datum or reference position in a range of movement of a movable member, by using an optical grating.

2. Background to the invention

In metrology, it is known to use optical gratings, eg gratings producing Moire fringes, to detect movement. This technique can be extremely accurate as a means of measuring movement but it suffers from the disadvantage that it is difficult to establish a datum or reference position from which movement is measured. The invention aims to overcome this disadvantage.

SUMMARY OF THE INVENTION

According to the invention there is provided apparatus for detecting a datum or reference position in a range of movement of a member, the apparatus comprising a light source, grating means movable with the member, the grating means comprising a first grating comprising first and second grating halves having parallel lines which are symmetrically arranged on respective sides of a central axis with the lines increasing in pitch in directions extending away from the central axis, a second grating comprising third and fourth grating halves respectively identical to the first and second grating halves but with the third and fourth grating halves being separated by a spacing, whereby light from the light source illuminates the first and second gratings to cause the generation of interference images of the first and third gratings and the generation of interference images of the second and fourth gratings, said interference images varying in light intensity with movement of the member, and detector means for detecting the intensity of the interferences images, for generating individual signals representative of the intensity of the interference images and for generating a difference signal representative of the difference between the said individual signals, said difference signal passing through zero at the datum position of the member.

The apparatus therefore achieves the result of providing a difference signal which passes through zero, so making detection of the datum position accurate and repeatable. It is envisaged that apparatus according to the invention will be used to sense the datum position of the movable difference signal which passes through zero, so making detection of the datum position accurate and repeatable. It is envisaged that apparatus according to the invention will be used to sense the datum position of the movable member, a further optical grating being used in a conventional manner to detect amplitude of movement from the detected datum.

In the preferred embodiment, the first and second gratings are mounted in co-planar relationship and the apparatus includes a lens and a mirror for reflecting the image of the third grating half upon the first grating half, the second grating half upon the fourth grating half, the first grating half upon the third grating half and the fourth grating half upon the second grating half. The detector means may be a quadrant detector, in which case the outputs from the first and third quadrants are summed to provide a first individual signal, and the outputs from the second and fourth quadrants are summed to produce a second individual signal, the individual signals being subtracted one from the other to provide the difference signal. The difference signal varies with displacement of the member and passes through zero when the member is at the datum position.

Apparatus according to the invention may detect a datum position to an accuracy of 1 micrometre, by using a grating in which said spacing is of the order of 50 micrometres and the finest grating pitch of about 100 micrometres, varying up to about 0.5 millimetres.

Apparatus according to the invention will now be Odescribed, by way of example, with reference to the accompanyig drawings in which:

FIG. 1 is an optical diagram of the apparatus,

FIG. 2 is an elevation, illustrated diagrammatically, of a grating of the apparatus, FIG. 3 is a view of a quadrant detector of the apparatus, and FIG. 4 shows graphs of signals arising in a detector of the apparatus.

DETAILED DESCRIPTION OF THE DRAWINGS

The apparatus is intended to detect a reference or datum position of a member 10 movable along an axis indicated by the double headed arrow 12. Attached to the member 10 is a grating means 14 having an array of parallel lines which are perpendicular to the axis 12 and which extend perpendicular to the plane of FIG. 1. The grating means 14 is illuminated with light from a laser diode-light source 16. From the source 16 the light passes through a lens 18, a polarising beam splitter 20 and a quarter wavelength delay plate 22 before reaching the grating means 14.

The grating means 14 is reflective and the light reflected from the grating means 14 passes through a telecentric lens system comprising a lens 24 and a mirror 26. The lens 24 is spaced from the grating means 14 and from the mirror 26 by a distance equal to the focal length of the lens 24. The telecentric lens system causes minimimal aberrations and has a stop 28 to adjust the depth of field.

The grating means 14 is shown in greater detail in FIG. 2. The grating means 14 comprises a first grating 30 which itself consists of a first grating half 32 and a second grating half 34, and a second grating 36 which consists of a third grating half 38 and a fourth grating half 40. The first and second grating halves 32 and 34 each have parallel lines which are symmetrically arranged on respective sides of a central axis 42, with the lines increasing in pitch in directions extending away from the central axis 42. The third and fourth grating halves 38 and 40 are respectively identical to the first and second grating halves 32 and 34, but are separated by a spacing 2.

It will be appreciated that the lens system acts to reflect the image of the complete grating means 14 by 180° rotation about the axis of the lens 24, thereby forming an interference image between the grating and its rotated image. In particular, the image of the second grating 36 is reflected onto the image of the first grating 30, and vice versa. As a result, the image of the third grating half 38 is overlaid on the area of the first grating half 32, the image of the fourth grating half 40 is overlaid on the area of the second grating half 34, the image of the first grating half 32 is overlaid on the area of the third grating half and the image of the second grating half 34 is overlaid on the area of the fourth grating half 40. The degree of overlay will depend on the position of the member 10, movement of the latter causing in effect the image of one grating half to slide over the cooperating grating half. Hence, the first and third grating halves produce interference images (which are identical in nature) and the second and fourth grating halves provide interference images (which are also identical in nature).

The interference images are reflected in the polarising beam splitter 20 and passed to a quadrant detector 44. The quadrant detector detects the signals in the four quadrants indicated as A, B, C and D in FIG. 3. The quadrant detector 44 sums the signals from quadrants A and C to produce a first individual signal indicated at 46 in FIG. 4a. The quadrant detector similarly sums the signals from quadrants B and D to produce a second individual signal indicated at 48 in FIG. 4b. It will be appreciated that the quadrant detector could use only quadrants A and B, or only quadrants C and D but this would halve the intensity of the resulting signal 46 or 48, and accuracy would therefore be sacrificed. FIG. 4a and 4b show the variation of the electrical signals 46 and 48 as the member 10 moves on either side of the reference or datum indicated at 50. Datum 50 corresponds to the position at which the lower end of the central axis 42 in FIG. 2 is positioned on the axis of the lens 24. It will be seen that signal 46 shows a pronounced turning point at a minimum when the axis 42 on the member 10 is spaced by a distance from the reference position 50, a being half the spacing between the grating halves 38 and 40. Similarly, the signal 48 shows a pronounced minimum at a turning point when the axis 42 is spaced by a distance a on the other side of the datum 50. These minima occur when the light intensities of the interference images detected by the quadrant detector 44 are a minimum. The quadrant detector 44 subtracts the individual signal 48 from the individual signal 46 to provide a difference electrical signal 52 shown in FIG. 4c. It will be seen that the signal 52 has a positive going slope passing through zero at the datum position 50. Hence, as the member 10 moves, the difference signal 52 is monitored and its transition through zero can be accurately detected in order to identify the position of the datum 50. With a spacing 2a between the grating halves 38 and 40 of 50 micrometres, the position of the datum 50 can be determined to an accuracy of 1 micrometre.

The signal from each quadrant A, B, C, D is an autocorrelation of the grating. Signals A and C are identical and signals B and D are identical to each other but shifted in space with respect to A and C.

We claim:

1. Apparatus for detecting a datum or reference position in a range of movement of a member, the apparatus comprising a light source, grating means movable with the member; the grating means including a first grating comprising first and second grating halves having parallel lines which are symmetrically arranged on respective sides of a central axis with the lines increasing in pitch in directions extending away from the central axis, a second grating comprising third and fourth grating halves respectively identical to the first and second grating halves but with the third and fourth grating halves being separated by a spacing, whereby light from the light source illuminates the first and second gratings to cause the generation of interference images of the first and third gratings and the generation of interference images of the second and fourth gratings, said interference images varying in light intensity with movement of the member, and detector means for detecting the intensity of the interference images, for generating individual signals representative of the intensity of the interference images and for generating a difference signal representative of the difference between the said individual signals, said difference signal passing through zero at the datum position of the member.

2. Apparatus according to claim 1, wherein the first and second gratings are mounted in co-planer relationship and the apparatus includes a lens and a mirror for reflecting the image of the third grating half upon the first grating half, the second grating half upon the fourth grating half, the first grating half upon the third grating half and the fourth grating half upon the second grating half.

3. Apparatus according to claim 1, wherein the detector means are a quadrant detector having first, second, third and fourth quadrants.

4. Apparatus according to claim 3, wherein the outputs from the first and third quadrants are summed to provide a first individual signal, and the outputs from the second and fourth quadrants are summed to produce a second individual signal, the individual signals being subtracted one from the other to provide the difference signal.

5. Apparatus according to claim 1 which is used to sense the datum position of the movable member, and including a further optical grating used to detect amplitude of movement from the detected datum.

* * * * *